US012508198B2

(12) United States Patent
Buc et al.

(10) Patent No.: US 12,508,198 B2
(45) Date of Patent: Dec. 30, 2025

(54) SYSTEM AND METHODS FOR CONTROLLING A SMART EXERCISE RECOVERY DEVICE AND MITIGATION OF DAMAGE FROM VIBRATIONS

(71) Applicant: HYPERICE IP SUBCO, LLC, Irvine, CA (US)

(72) Inventors: Bostjan Buc, Irvine, CA (US); Anthony Katz, San Diego, CA (US); James Huether, Irvine, CA (US); Blaz Selekar, Irvine, CA (US); Simon Bracic, Irvine, CA (US)

(73) Assignee: HYPERICE IP SUBCO, LLC, Irvine, CA (US)

( * ) Notice: Subject to any disclaimer, the term of this patent is extended or adjusted under 35 U.S.C. 154(b) by 128 days.

(21) Appl. No.: 17/383,794

(22) Filed: Jul. 23, 2021

(65) Prior Publication Data

US 2022/0023141 A1 Jan. 27, 2022

Related U.S. Application Data

(60) Provisional application No. 63/055,472, filed on Jul. 23, 2020.

(51) Int. Cl.
*A61H 23/00* (2006.01)

(52) U.S. Cl.
CPC ... *A61H 23/006* (2013.01); *A61H 2201/0153* (2013.01); *A61H 2201/501* (2013.01);
(Continued)

(58) Field of Classification Search
CPC .. A61H 1/006; A61H 1/008; A61H 23/00–06; A61H 2023/002–045
See application file for complete search history.

(56) References Cited

U.S. PATENT DOCUMENTS 4,680,704 A * 7/1987 Konicek ................ G01D 4/008 356/615
7,144,417 B2 12/2006 Colloca et al.
(Continued)

FOREIGN PATENT DOCUMENTS

EP 3650002 A1 5/2020
JP H0962345 A * 3/1997
(Continued)

OTHER PUBLICATIONS

Zhao, Xin. "What Exactly "Automotive Grade" is?". Feb. 8, 2020. Published on Linkedin, and accessed at <https://www.linkedin.com/pulse/what-exactly-automotive-grade-xin-zhao>. (Year: 2020).*
(Continued)

*Primary Examiner* — Paige Kathleen Bugg
(74) *Attorney, Agent, or Firm* — Goodwin Procter LLP

(57) ABSTRACT

A printed circuit board (PCB) configured to be included in a massage applicator. The PCB including a clock module configured to provide at least one clock signal, a controller configured to receive the at least one clock signal from the clock module and control a motor of the massage applicator to provide a plurality of vibration levels, and an optical sensor configured to capture a rotation of a swivel dial indicating a desired vibration level of the plurality of vibration levels.

18 Claims, 3 Drawing Sheets

100

(52) U.S. Cl.
CPC ................ *A61H 2201/5084* (2013.01); *A61H 2201/5092* (2013.01)

(56) References Cited

U.S. PATENT DOCUMENTS

| | | | | |
|---|---|---|---|---|
| 10,945,914 | B1 * | 3/2021 | Liu | G06Q 20/123 |
| 2015/0305974 | A1 | 10/2015 | Ehrenreich et al. | |
| 2015/0359704 | A1 * | 12/2015 | Imboden | A61H 23/0263 601/72 |
| 2016/0329837 | A1 * | 11/2016 | Kataoka | A61B 5/0263 |
| 2017/0241834 | A1 * | 8/2017 | Lin | G01J 1/06 |
| 2018/0124529 | A1 * | 5/2018 | Larsen | H04R 25/00 |
| 2019/0053968 | A1 * | 2/2019 | Vergara | A61H 23/02 |
| 2019/0236935 | A1 | 8/2019 | Pfenniger et al. | |
| 2019/0307373 | A1 * | 10/2019 | Nyberg | A61B 5/4266 |
| 2019/0332350 | A1 * | 10/2019 | Bromand | H04N 21/472 |
| 2020/0261307 | A1 * | 8/2020 | Wersland | A61H 1/00 |
| 2020/0261310 | A1 * | 8/2020 | Wersland | A61H 1/00 |
| 2020/0268494 | A1 * | 8/2020 | Senff | A61C 17/0205 |
| 2021/0093506 | A1 * | 4/2021 | Reynolds | A61H 31/006 |
| 2021/0128402 | A1 * | 5/2021 | Dai | A61F 7/00 |
| 2021/0205604 | A1 * | 7/2021 | Andersen | A61N 1/3956 |
| 2021/0244610 | A1 * | 8/2021 | Wersland | A61H 23/006 |
| 2021/0244611 | A1 * | 8/2021 | Wersland | A61H 23/02 |

FOREIGN PATENT DOCUMENTS

| | | | | | |
|---|---|---|---|---|---|
| KR | 20110044661 | A | * | 4/2011 | |
| WO | WO-2020/023093 | A2 | | 1/2020 | |
| WO | WO-2021081189 | A1 | * | 4/2021 | A61H 1/00 |
| WO | WO-2021202757 | A1 | * | 10/2021 | |

OTHER PUBLICATIONS

Translation of JP-H0962345-A. Accessed from PE2E-SEARCH on Apr. 29, 2024. (Year: 1997).*

Translation of KR-2011004661-A. Accessed from PE2E-SEARCH on Apr. 29, 2024. (Year: 2011).*

International Preliminary Report on Patentability of PCT/US2021/042884 dated Jan. 24, 2023.

* cited by examiner

300

SYSTEM AND METHODS FOR CONTROLLING A SMART EXERCISE RECOVERY DEVICE AND MITIGATION OF DAMAGE FROM VIBRATIONS

CROSS-REFERENCE TO RELATED APPLICATIONS

This application claims priority and benefit from U.S. Provisional Application No. 63/055,472, titled "System and Methods for Controlling a Smart Exercise Recovery Device and Mitigation of Damage from Vibrations" and filed on Jul. 23, 2020, which is hereby incorporated by reference herein in its entirety.

FIELD

The present disclosure is related to the field of therapeutic devices, and, more particularly, is related the field of devices that apply percussive massage to selected portions of a body.

BACKGROUND

Percussive massage, which is also referred to as tapotement, is the rapid, percussive tapping, slapping and cupping of an area of the human body. Percussive massage is used to more aggressively work and strengthen deep-tissue muscles. Percussive massage increases local blood circulation and can even help tone muscle areas. Percussive massage may be applied by a skilled massage therapist using rapid hand movements; however, the manual force applied to the body varies, and the massage therapist may tire before completing a sufficient treatment regime.

Percussive massage may also be applied by electromechanical percussive massage devices (percussive applicators), which are commercially available. Such percussive applicators may include, for example, an electric motor coupled to drive a reciprocating piston within a cylinder. A variety of percussive heads may be attached to the piston to provide different percussive effects on selected areas of the body. Many of the known percussive applicators are expensive, large, relatively heavy, and tethered to an electrical power source. For example, some percussive applicators may require users to grip the applicators with both hands in order to control the applicators. Some percussive applicators are relatively noisy because of the conventional mechanisms used to convert the rotational energy of an electric motor to the reciprocating motion of the piston.

When a percussive massage device is applied to a body of a human, the efficacy of the therapy provided by the percussive massage device depends in part on the pressure applied to the body. For certain persons, a lower pressure provides a relaxing massage and a higher pressure may be uncomfortable. For other persons, a higher pressure is required to provide relief from sore muscles and other tissues. For many persons, the pressure needs to be varied from location to location on their bodies. Presently available percussive massage devices do not provide a way to determine the pressure applied to a body. Thus, achievement of a correct pressure for a particular location on the body of a specific person relies on the skill and the memory of the massage therapist applying a percussive massager. Even with the same percussive massage equipment, the same therapist is not likely to provide the appropriate pressures during two successive treatment.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

At least one aspect of the present disclosure is directed to a printed circuit board (PCB) configured to be included in a massage applicator. The PCB includes a clock module configured to provide at least one clock signal, a controller configured to receive the at least one clock signal from the clock module and control a motor of the massage applicator to provide a plurality of vibration levels, and an optical sensor configured to capture a rotation of a swivel dial indicating a desired vibration level of the plurality of vibration levels.

In one embodiment, the PCB includes a first surface and a second surface opposed from the first surface, wherein the clock module, the controller, and the optical sensor are each disposed on one of the first surface or the second surface. In some embodiments, the clock module, the controller, and the optical sensor are coupled to the first or second surface of the PCB. In various embodiments, the clock module, the controller, and the optical sensor are included in surface mount device (SMD) packages. In certain embodiments, the clock module, the controller, and the optical sensor are automotive grade components.

In some embodiments, the PCB includes an accelerometer module configured to provide an indication of motion of the massage applicator to the controller, the accelerometer module being disposed on one of the first surface or the second surface of the PCB. In one embodiment, the PCB includes at least one first connector disposed on the first surface and/or the second surface of the PCB, the at least one first connector configured to receive and/or provide control signals to at least one of the motor of the massage applicator and a battery of the massage applicator. In certain embodiments, the PCB includes at least one second connector disposed on the first surface and/or the second surface of the PCB, the at least one second connector configured to receive power from the battery of the massage applicator. In various embodiments, the PCB includes a power supply module configured to regulate the power received from the battery of the massage applicator, the power supply module being disposed on one of the first surface or the second surface of the PCB.

Another aspect of the disclosure is directed to a massage applicator. The massage applicator includes a motor configured to provide a plurality of vibration levels, a printed circuit board (PCB), and a swivel dial configured to enable a user to control the massage applicator.

In one embodiment, the massage applicator includes a clock module configured to provide at least one clock signal, a controller configured to receive the at least one clock signal from the clock module and control the motor, and an optical sensor configured to capture a rotation of the swivel dial indicating a desired vibration level of the plurality of vibration levels, wherein the clock module, the controller, and the optical sensor are each disposed on one of a first surface or a second surface of the PCB. In some embodiments, the clock module, the controller, and the optical sensor are attached, fastened, mounted, and/or bonded to the first or second surfaces of the PCB. In various embodiments, the clock module, the controller, and the optical sensor are included in surface mount device (SMD) packages. In certain embodiments, the clock module, the controller, and the optical sensor are automotive grade components.

In some embodiments, the massage applicator includes an accelerometer module configured to provide an indication of motion of the massage applicator to the controller, the accelerometer module being disposed on the PCB. In one embodiment, the massage applicator includes a battery and at least one first connector disposed on the PCB, the at least one first connector configured to receive and/or provide control signals to at least one of the motor and the battery. In certain embodiments, the massage applicator includes at least one second connector disposed on the PCB, the at least one second connector configured to receive power from the battery.

Another aspect of the present disclosure is directed to a method of assembling a printed circuit board (PCB) configured to be included in a massage applicator. The method includes providing the PCB having a first surface and a second surface opposed from the first surface, disposing a clock module on one of the first surface or the second surface of the PCB, the clock module being configured to provide at least one clock signal, disposing a controller on one of the first surface or the second surface of the PCB, the controller being configured to receive the at least one clock signal from the clock module and control a motor of the massage applicator to provide a plurality of vibration levels, and disposing an optical sensor on one of the first surface or the second surface of the PCB, the optical sensor being configured to capture a rotation of a swivel dial indicating a desired vibration level of the plurality of vibration levels.

In one embodiment, the method includes attaching, fastening, mounting, and/or bonding each of the clock module, the controller, and the optical sensor to the first or second surfaces of the PCB. In some embodiments, the method includes disposing an accelerometer module on one of the first surface or the second surface of the PCB, the accelerometer module being configured to provide an indication of motion of the massage applicator to the controller. In various embodiments, the method includes disposing at least one first connector on the first surface and/or the second surface of the PCB, the at least one first connector being configured to receive and/or provide control signals to at least one of the motor of the massage applicator and a battery of the massage applicator. In certain embodiments, the method includes disposing at least one second connector on the first surface and/or the second surface of the PCB, the at least one second connector being configured to receive power from the battery of the massage applicator.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

DETAILED DESCRIPTION

Figure 1:
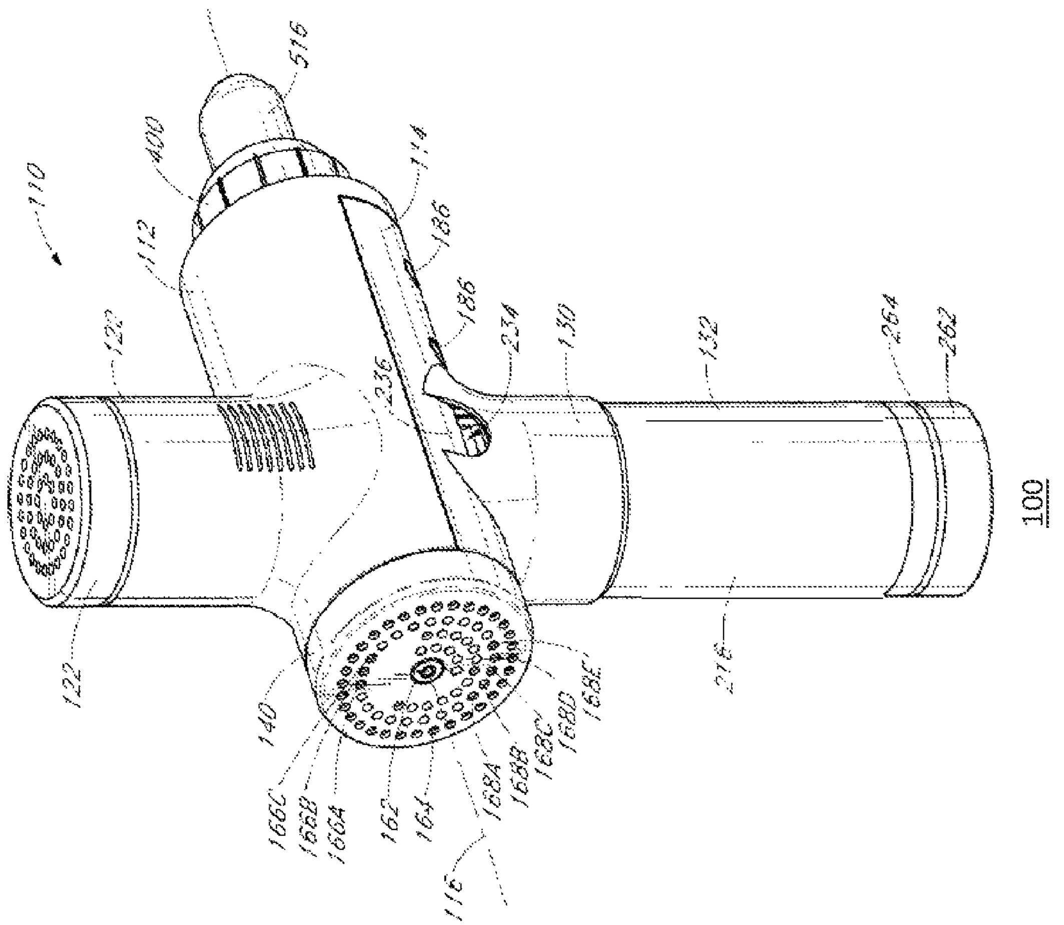
FIG. 1 illustrates a top perspective view of a portable electromechanical percussive massage applicator that is battery powered and has a single hand grip, the view in FIG. 1 showing the top, the right side and the proximal end (the end closest to a user (not shown)) of the applicator in accordance with aspects described herein.

As used throughout this specification, the words "upper," "lower," "longitudinal," "upward," "downward," "proximal," "distal," and other similar directional words are used with respect to the views being described. It should be understood that the percussive massage applicator described herein can be used in various orientations and is not limited to use in the orientations illustrated in the drawing figures.

A system and methods for controlling a smart exercise recovery device are disclosed. FIG. 1 illustrates a portable electromechanical percussive massage applicator. The portable electromechanical percussive massage applicator 100 includes a main body 110. The main body includes an upper body portion 112 and a lower body portion 114. The two body portions engage to form a generally cylindrical enclosure about a longitudinal axis 116.

Figure 2:
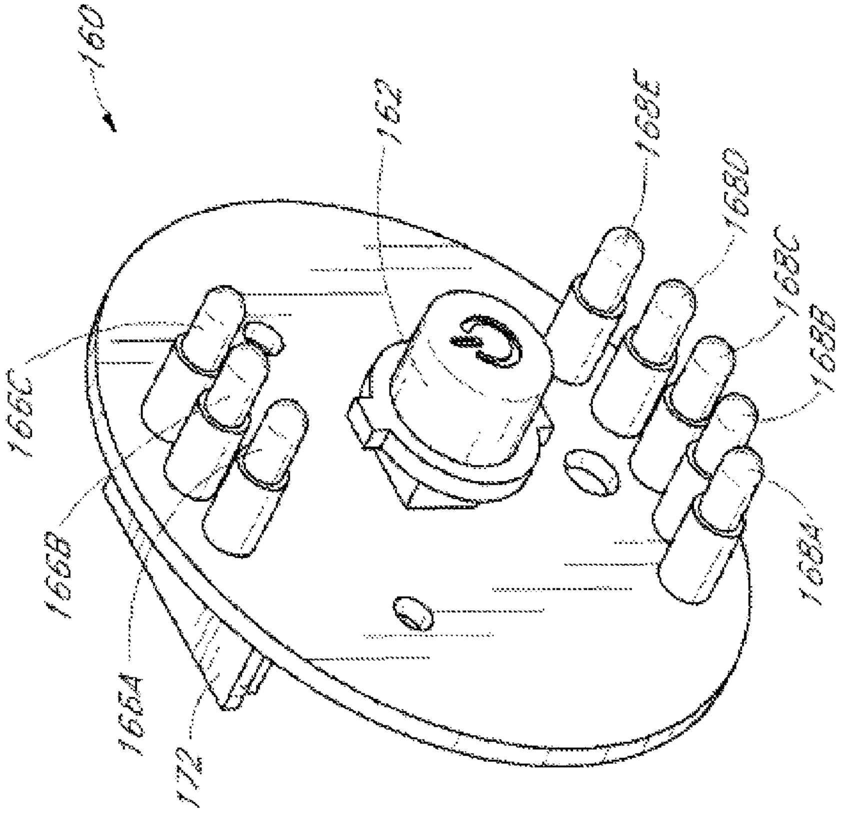
FIG. 2 illustrates a printed circuit board (PCB) that is positioned within the endcap of the housing of a massage applicator in accordance with aspects described herein.

FIG. 2 illustrates a main printed circuit board (PCB) 160 that is positioned within the endcap 140 of the housing of the massage applicator 100. As shown in FIG. 2, the proximal side of the main PCB 160 supports a central pushbutton switch 162. In one example, the switch 162 is electrically and/or mechanically coupled to the main PCB 160. In some examples, the switch 162 is configured to be attached, fastened, mounted, and/or bonded to the main PCB 160. The operation of the switch 162 is used to turn on the massage applicator 100. As shown in FIG. 1, the switch 162 is surrounded on the endcap 140 by a plurality of bores 164, which extend perpendicularly from the outer (proximal) surface of the endcap 140 to form a plurality of concentric rows of bores. Three of the bores above the switch have respective speed indication light-emitting diodes (LEDs) 166A, 166B, 166C positioned therein. In one example, each of the LEDs 166A, 166B, 166C is electrically and/or mechanically coupled to the main PCB 160. In some examples, each of the LEDs 166A, 166B, 166C is configured to be attached, fastened, mounted, and/or bonded to the main PCB 160. The three LEDs 166A, 166B, 166C extend from the proximal side of the PCB 160 as shown in FIG. 2. The three LEDs provide an indication of the operational state of the percussive massage applicator 100. Five of the bores located below the switch 162 have respective battery charge state LEDs 168A, 168B, 168C, 168D, 168E positioned therein. In one example, each of the LEDs 168A-168E is electrically and/or mechanically coupled to the main PCB 160. In some examples, each of the LEDs 168A-168E is configured to be attached, fastened, mounted, and/or bonded to the main PCB 160. The five LEDs 168A-168E also extend from the proximal side of the PCB 160 as shown in FIG. 2. The five LEDs 168A-168E provide an indication of the charge state of the battery when the battery assembly 132 is attached and is providing power to the percussive massage applicator 100. The distal side of the PCB 160 supports a first plug 170 (not shown) connectable to the battery assembly 132. The distal side of the PCB 160 also supports a second plug 172 connectable to the motor assembly 124. In one example, the first plug 170 and the second plug 172 are electrically and/or mechanically coupled to the main PCB 160. In some examples, the first plug 170 and the second plug 172 are configured to be attached, fastened, mounted, and/or bonded to the main PCB 160.

Figure 3:
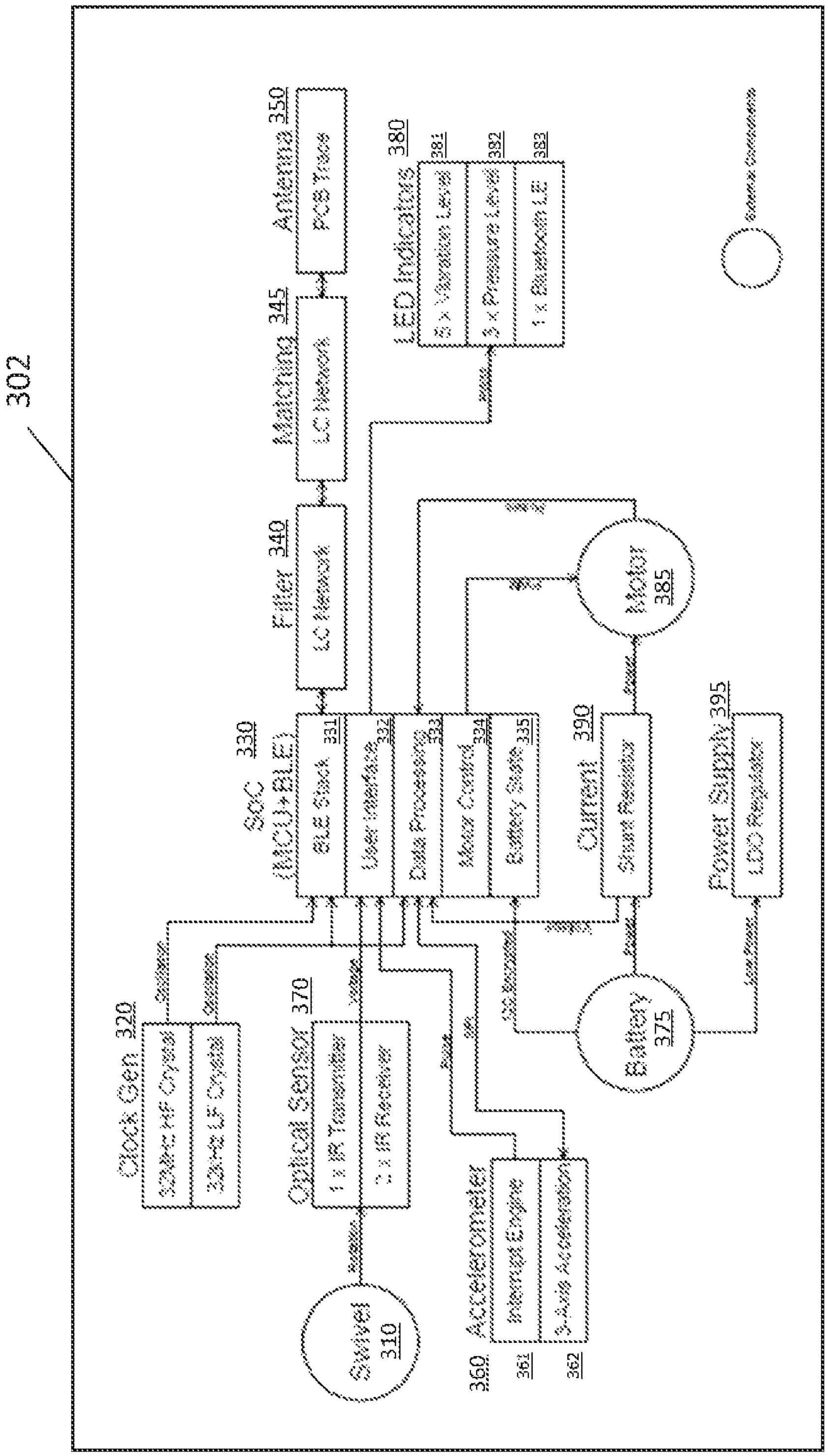
FIG. 3 illustrates a system diagram for controlling a massage applicator in accordance with aspects described herein.

FIG. 3 illustrates a block diagram of a system 300 for controlling a smart exercise recovery device, according to one embodiment. The present smart exercise recovery device may be a portable electromechanical percussive massage applicator as shown in FIG. 1. Other than the motor 385, battery 375, and swivel dial 310, all components of system 300 are part of (or disposed on) a single printed circuit board 302 (which in some embodiments can be the same as PCB 160), according to one embodiment. Particularly, the single PCB 302 may hold one or more of clock gen block 320, SoC 330, filter 340, matching block 345, antenna 350, LED indicators 380, optical sensor 370, current module 390, accelerometer 360, and power supply 395 for the smart recovery device. In one example, each of the above components is electrically and/or mechanically coupled to a first surface (e.g., top side) or a second surface (e.g., bottom side) of the PCB 302. In some examples, each of the above components is configured to be attached, fastened, mounted, and/or bonded to the PCB 302. While not shown, signal connectors (or plugs) may be electrically and mechanically coupled to the first and/or second surface of the PCB 302 to receive and provide control signals to/from the motor 385, the battery 375, and/or the swivel dial 310. Likewise, one or more power connectors (or plugs) may be electrically and mechanically coupled to the first and/or second surface of the PCB 302 to receive power from the battery 375.

In many cases, conventional devices include two or more PCBs. For example, such devices can include one or more PCBs dedicated to encoder functions (e.g., user input) and one or more PCBs dedicated to the main functions of the device. By having a single PCB, the control system 300 improves on prior systems by solving serviceability problems requiring the diagnoses of two or more PCBs for failure before replacement. In addition, cost savings can be realized by providing a single, robust PCB. Being that the present system 300 is contained on a single PCB 302, the system 300 may be easily replaced.

Swivel Dial 310

The present control system 300 improves performance and user interaction over prior push button systems by having a swivel dial 310 to control the smart exercise recovery device. The swivel dial 310 provides significant improvements in vibration rejection relative to push button switches (e.g., switch 162). As such, the swivel dial 310 may have an extended lifetime due to the decrease in vibration exposure. In addition, the swivel dial 310 may experience fewer false readings (e.g., false push or multi-push events). In some examples, the swivel dial 310 is configured to be rotated via a sufficient force applied by the user to provide uniquely defined dial positions.

System On Chip (SoC)

The SoC 330 is a single chip containing the central processing unit (MCU), volatile and non-volatile memory, digital and analog peripheral modules (e.g., swivel dial 310) and the radio for wireless communication (e.g., low power Bluetooth and/or WiFi chipsets—not shown). SoC 33 includes a BLE stack 331, user interface module 332, data processing module 333, motor control module 334, and battery state module 335. The SoC 330 may be referred to herein as the controller of the system 300.

User actions are captured using an analog peripheral (changing voltage when turning the swivel dial 310) or a digital peripheral (pulse on movement start and serial data communication when further moving the device). The current state of the device will be shown to the user via LED indicators 380, including vibration level LEDs 381, pressure level LEDs 382 and Bluetooth connectivity status LED 383. According to one embodiment, digital peripherals are interfaces working on logic levels (e.g., switching something on or off, getting the state of a button, etc.). Analog peripherals, according to one embodiment, measure or output an analog signal (e.g., measuring the battery voltage, outputting an audio signal for a speaker, etc.)

The SoC 330 also controls the motor 385 speed and therefore the vibration level using a digital peripheral being able to generate a pulse width modulation (PWM) signal. In some examples, the SoC 330 is configured to control the motor 385 speed to provide a plurality of vibration levels.

A timer on the SoC 330 measures the pulse width of a digital signal from the battery 375 and to turn this information to battery voltage level and battery charging state details.

Having a fully integrated Bluetooth LE (BLE) radio and a BLE software stack 331, the SoC 330 receives and executes commands for changing the vibration level wirelessly. SoC 330 also transmits the current device state, such as the battery level to any connected and authorized BLE master device (e.g. smartphone application).

The data processing module 333 of the SoC 330 processes available information (e.g., motor current, motor speed, battery voltage, pulses from the swivel dial 310, the user selected vibration level, commands received via BLE, etc.) and sets the device to the state the user requested. Data processing module 333 prioritizes contradictory commands (e.g., user turns swivel dial 310 to increase the vibration level but at the same time sends a command for decreasing the pressure level via a smartphone application through the BLE connection). In addition, battery state module 333 receives real-time data such as the current flowing from the battery 375 to the motor 385, the battery voltage and the resulting motor speed. The SoC 330 calculates the load on the motor 385 which correlates to the pressure applied to the muscle tissue. SoC 330 monitors the operating conditions of the device allowing for overload protection (e.g. by reducing the current flowing to the motor 385 when trying to block the motor 385 or keeping the motor 385 at its maximum speed setting causing the motor 385 to overheat).

Clock Generation (Clock Gen) 320

The SoC 330 uses a high frequency (HF) clock and high precision clock for operating the BLE radio and for performing tasks demanding accurate high resolution timing. The high frequency clock is also used for fast and efficient software execution. Due to the high current consumption of the HF clock, whenever high resolution timing is not required, the present control system 300 uses a low frequency (LF) clock to reduce power consumption of the battery 375.

Optical Sensor 370

The optical sensor unit 370 has a light source (IR transmitter) and two photo sensors (IR receivers) arranged to yield two light beams. For capturing any rotation of the swivel dial 310, a rotary encoder (not shown) attached to optical sensor unit 370 has alternating opaque and transparent segments that interrupts the staggered light beams. The SoC 330 extracts both the rotation speed and also the rotation direction of the swivel dial 310 from the voltage signal coming from the photo sensors 370.

LED Indicators 380

The present vibration level, the present pressure level and whether the device has a BLE connection are shown using LEDs 380. To be able to adjust the brightness of the LEDs 380, the SoC 330 uses a digital peripheral to generate a PWM signal that regulates the duty cycle of the power supply 395 of the LEDs 380.

Accelerometer 360

A three-axis micro electro mechanical system (MEMS) acceleration sensor 360 measures static acceleration relative to the Earth's gravity. This sensor 360 has a motion detection mode that works as an autonomous system with very low current consumption, to signal the motion of the smart recovery device to the SoC 330.

The motion detection mode allows the remaining components of system 300 on the PCB 302 to enter a low power mode whenever there is no motion for a certain time and to wake up the present system immediately on sensing motion of the smart recovery device. When no motion is detected for a period of time, the user interface including LEDs can be turned off, and/or turn off the BLE radio so that the smart recovery device is not visible to a BLE master (e.g. smartphone).

The 3-axis acceleration data is also used to calculate the orientation of the smart recovery device in the absence of linear acceleration. The accelerometer 360 measures the difference between any linear acceleration in the sensor's reference frame and the earth's gravitational field vector. The accelerometer 360 can be used to determine the accelerometer pitch and roll orientation angles. However, as soon as the smart recovery device is in any vibration mode, highly optimized filters and algorithms separate the interfering acceleration caused by these vibrations. The accelerometer 360 may be used to indicate a beneficial orientation of the present smart recovery device depending on the detected acceleration of or pressure applied by the massaging head.

As the earth's gravitational field is static and any motion and/or vibration can be assumed to change over time, a low-pass filter is used to eliminate the unwanted dynamic part in the acceleration sensor output. However, there is a tradeoff between removing any dynamic signal and getting a fast response when changing the orientation. Using a low-pass filter to remove slow motion signals would result in an unacceptable slow response time for determining any changes in orientation. Therefore, some checks and pattern recognition processes are used to change filter coefficients or even bypassing parts of the filter in case output values or value patterns indicate an orientation change rather than a vibration and/or motion.

Another problem is that vibration, motion or shock may result in acceleration values passing the measurement range of the sensor 360. Most filters are quite susceptible to value clipping, so the present system uses filters that are robust and forgiving. In data preprocessing, the present system recognizes filter clipping and modifies the acceleration data so that the filters are able to work smoothly.

Power Supply 395

A low dropout (LDO) regulator is used to regulate the power provided by the battery. For example, the LDO regulator can be used to regulate the battery voltage down to the voltage level required for supplying the active components of system 300 on the PCB 302.

Current 390

The dynamic current flowing from the battery 375 to the motor 385 is determined by inserting a precise shunt resistor 390 in series with the load (motor 385) and then measuring the voltage drop across this resistor 390 using an analog-to-digital converter peripheral module (e.g., converts an analog voltage to a digital value that can be further processed in the microcontroller) of the SoC 330.

Filter 340

The radio signal generated in the SoC 330 contains spurious emissions. Depending on the country the device has to be used in and therefore to be certified for, different limits are allowed for these emissions. The filter network 340 reduces the emissions to a level below the known limits without significantly affecting the intended radio signal quality.

Matching 345

Due to space and cost restrictions for the radio antenna 350 and the environment affecting the behavior of the antenna 350, an impedance matching of the antenna 350 to the SoC 330 output respectively to the filter between output and antenna 350 is used.

Antenna 350

The radio antenna 350 transmits and receives electromagnetic waves from and to the BLE radio hardware on the SoC 330. The antenna 350 has an omnidirectional radiation pattern and an equal performance over the whole frequency band used for BLE, but at the same time having at small footprint on the PCB 302. In other examples, the radio antenna 350 may be an external antenna coupled to the PCB 302.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

Vibration Damage Mitigation

Prior percussive massage applicators would stop working or suffer from poor performance due to the vibrations caused by the percussive nature of the applicator. The present system 300 has better reliability than prior percussive massage applicators for a number of reasons. As described above, by having a single PCB (e.g., PCB 302), the control system 300 improves on prior massage applicators by solving serviceability problems requiring the diagnoses of two or more PCBs for failure before replacement. In addition, prior systems have components that are electrically connected via thin wires that are susceptible to breaking close to the connection point of the component with the wire. Instead, the present system 300 uses surface mount devices (SMD) for at least a portion of the components described above to provide vibration damage mitigation. In one example, the SMD packages are configured to be mounted directly on the surface of the PCB 302. For example, the clock module 320, SoC 330, filter 340, matching module 345, antenna 350, current module 390, accelerometer 360, power supply 395, optical sensor 370, and/or LED indicators 380 may be configured as surface mount devices having SMD packages mounted on/to the single PCB 302. The SMD packages include pins or contacts configured to provide vibration resiliency. In certain examples, the SMD packages can include an array of pins or balls disposed under the device package (e.g., ball grid arrays). Likewise, the switch 162, the LEDs 166A-166C, the LEDs 168A-168E, the first plug 170, and/or the second plug 172 may be configured with SMD packages and mounted on/to the main PCB 160.

In some examples, the present system 300 includes components that meet automotive quality standards to mitigate (or prevent) internal damage caused by vibrations. For example, the system 300 may include AEC-Q100 grade components for integrated circuits, AEC-Q101 grade components for discrete semiconductors, AEC-Q102 grade components for optoelectronic semiconductors, AEC-Q104 grade components for multichip modules, and AEC-Q200 grade components for passive components. According to one embodiment, one or more of the clock module 320, SoC 330, accelerometer 360 and connectors may meet these automotive quality standards.

Using the above described components for vibration damage mitigation, the present system 300 can withstand testing procedures including up to 3,500 vibrations per minute and intensities (e.g., drop test) of up to 5 times the normal tested force of 16 Gs (gravitational force equivalent).

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

The term “approximately”, the phrase “approximately equal to”, and other similar phrases, as used in the specification and the claims (e.g., “X has a value of approximately Y” or “X is approximately equal to Y”), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles “a” and “an,” as used in the specification and in the claims, unless clearly indicated to the contrary, should be understood to mean “at least one.” The phrase “and/or,” as used in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified. Thus, as a non-limiting example, a reference to “A and/or B”, when used in conjunction with open-ended language such as “comprising” can refer, in one embodiment, to A only (optionally including elements other than B); in another embodiment, to B only (optionally including elements other than A); in yet another embodiment, to both A and B (optionally including other elements); etc.

As used in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used shall only be interpreted as indicating exclusive alternatives (i.e. “one or the other but not both”) when preceded by terms of exclusivity, such as “either,” “one of” “only one of” or “exactly one of.” “Consisting essentially of,” when used in the claims, shall have its ordinary meaning as used in the field of patent law.

As used in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified. Thus, as a non-limiting example, “at least one of A and B” (or, equivalently, “at least one of A or B,” or, equivalently “at least one of A and/or B”) can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of “including,” “comprising,” “having,” “containing,” “involving,” and variations thereof, is meant to encompass the items listed thereafter and additional items.

Use of ordinal terms such as “first,” “second,” “third,” etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A printed circuit board (PCB) configured to be included in a massage applicator, the PCB comprising:

a first surface;

a second surface opposed from the first surface;

a clock module disposed on the first surface and configured to provide at least one clock signal;

a controller comprising a wireless communication module, wherein the controller is configured to receive the at least one clock signal from the clock module, use the at least one clock signal for operating the wireless communication module, and control a motor of the massage applicator to provide a plurality of vibration levels, and wherein the controller is disposed on one of the first surface or the second surface;

an optical sensor comprising a rotary encoder, at least one light source, and at least two photo sensors, wherein the optical sensor is disposed on one of the first surface or the second surface, wherein the rotary encoder is configured to capture a rotation of a swivel dial indicating a desired vibration level of the plurality of vibration levels, and wherein the controller is configured to determine (i) a rotation speed of the swivel dial and (ii) a rotation direction of the swivel dial based on a voltage signal from the at least two photo sensors; and an accelerometer module configured to provide an indication of motion of the massage applicator to the controller, the accelerometer module being disposed on one of the first surface or the second surface of the PCB, wherein the controller is configured to (i) determine a beneficial orientation of the massage applicator based on the indication of motion of the massage applicator and (ii) turn off the wireless communication module when no motion of the massage applicator is detected by the accelerometer module for a period of time.

2. The PCB of claim 1, wherein the clock module, the controller, and the optical sensor are included in surface mount device (SMD) packages.

3. The PCB of claim 1, wherein the clock module, the controller, and the optical sensor are automotive grade components.

4. The PCB of claim 1, further comprising at least one first connector disposed on the first surface and/or the second surface of the PCB, the at least one first connector configured to receive and/or provide control signals to at least one of the motor of the massage applicator and a battery of the massage applicator.

5. The PCB of claim 4, further comprising at least one second connector disposed on the first surface and/or the second surface of the PCB, the at least one second connector configured to receive power from the battery of the massage applicator.

6. The PCB of claim 5, further comprising a power supply module configured to regulate the power received from the battery of the massage applicator, the power supply module being disposed on one of the first surface or the second surface of the PCB.

7. The PCB of claim 1, wherein the rotary encoder comprises a plurality of alternating opaque and transparent segments, wherein the at least one light source comprises an IR transmitter, and wherein the at least two photo sensors each comprise an IR receiver.

8. A massage applicator comprising:

a motor configured to provide a plurality of vibration levels;

a printed circuit board (PCB) comprising a first surface;

a clock module disposed on the first surface and configured to provide at least one clock signal;

a controller comprising a wireless communication module, wherein the controller is configured to receive the at least one clock signal from the clock module, use the at least one clock signal for operating the wireless communication module, and control the motor;

a swivel dial configured to enable a user to control the massage applicator;

an optical sensor comprising a rotary encoder, at least one light source, and at least two photo sensors, wherein the rotary encoder is configured to capture a rotation of the swivel dial indicating a desired vibration level of the plurality of vibration levels, and wherein the controller is configured to determine (i) a rotation speed of the swivel dial and (ii) a rotation direction of the swivel dial based on a voltage signal from the at least two photo sensors; and an accelerometer module configured to provide an indication of motion of the massage applicator to the controller, the accelerometer module being disposed on the PCB, wherein the controller is configured to (i) determine a beneficial orientation of the massage applicator based on the indication of motion of the massage applicator and (ii) turn off the wireless communication module when no motion of the massage applicator is detected by the accelerometer module for a period of time.

9. The massage applicator of claim 8, further comprising: the controller and the optical sensor are each disposed on one of the first surface or a second surface of the PCB.

10. The massage applicator of claim 9, wherein the clock module is attached, fastened, mounted, and/or bonded to the first surface of the PCB, and wherein the controller and the optical sensor are attached, fastened, mounted, and/or bonded to the first surface or second surface of the PCB.

11. The massage applicator of claim 9, wherein the clock module, the controller, and the optical sensor are included in surface mount device (SMD) packages.

12. The massage applicator of claim 9, wherein the clock module, the controller, and the optical sensor are automotive grade components.

13. The massage applicator of claim 8, further comprising:

a battery; and at least one first connector disposed on the PCB, the at least one first connector configured to receive and/or provide control signals to at least one of the motor and the battery.

14. The massage applicator of claim 13, further comprising at least one second connector disposed on the PCB, the at least one second connector configured to receive power from the battery.

15. A method of assembling a printed circuit board (PCB) configured to be included in a massage applicator, the method comprising:

providing the PCB having a first surface and a second surface opposed from the first surface;

disposing a clock module on one of the first surface or the second surface of the PCB, the clock module being configured to provide at least one clock signal;

disposing a controller on one of the first surface or the second surface of the PCB, the controller comprising a wireless communication module and being configured to receive the at least one clock signal from the clock module, use the at least one clock signal for operating the wireless communication module, and control a motor of the massage applicator to provide a plurality of vibration levels;

disposing an optical sensor on one of the first surface or the second surface of the PCB, the optical sensor comprising a rotary encoder, at least one light source, and at least two photo sensors, wherein the rotary encoder is configured to capture a rotation of a swivel dial indicating a desired vibration level of the plurality of vibration levels, and wherein the controller is configured to determine (i) a rotation speed of the swivel dial and (ii) a rotation direction of the swivel dial based on a voltage signal from the at least two photo sensors; and disposing an accelerometer module on one of the first surface or the second surface of the PCB, the accelerometer module being configured to provide an indication of motion of the massage applicator to the controller, wherein the controller is configured to (i) determine a beneficial orientation of the massage applicator based on the indication of motion of the massage applicator and (ii) turn off the wireless communication module when no motion of the massage applicator is detected by the accelerometer module for a period of time.

16. The method of claim 15, further comprising attaching, fastening, mounting, and/or bonding each of the clock module, the controller, and the optical sensor to the first surface or second surface of the PCB.

17. The method of claim 15, further comprising disposing at least one first connector on the first surface and/or the second surface of the PCB, the at least one first connector being configured to receive and/or provide control signals to at least one of the motor of the massage applicator and a battery of the massage applicator.

18. The method of claim 17, further comprising disposing at least one second connector on the first surface and/or the second surface of the PCB, the at least one second connector being configured to receive power from the battery of the massage applicator.

* * * * *